(12) United States Patent
Goto et al.

(10) Patent No.: US 7,109,769 B2
(45) Date of Patent: Sep. 19, 2006

(54) PWM SIGNAL GENERATOR

(75) Inventors: Toshiharu Goto, Yamagata (JP); Isao Shime, Yamagata (JP)

(73) Assignee: NEC Electronics Corporation, Kanagawa (JP)

( * ) Notice: Subject to any disclaimer, the term of this patent is extended or adjusted under 35 U.S.C. 154(b) by 15 days.

(21) Appl. No.: 10/998,992

(22) Filed: Nov. 30, 2004

(65) Prior Publication Data

US 2005/0134343 A1    Jun. 23, 2005

(30) Foreign Application Priority Data

Dec. 9, 2003    (JP)    ............................. 2003-410406

(51) Int. Cl.
*H03K 3/017*    (2006.01)

(52) U.S. Cl. ...................... 327/175; 327/172

(58) Field of Classification Search .................. 327/18, 327/20, 172, 173, 174, 175, 176
See application file for complete search history.

(56) References Cited

U.S. PATENT DOCUMENTS 5,914,622 A * 6/1999 Inoue ........................ 327/172

FOREIGN PATENT DOCUMENTS

JP    5-49263    2/1993

* cited by examiner

*Primary Examiner*—Linh My Nguyen
(74) *Attorney, Agent, or Firm*—McGinn IP Law Group, PLLC

(57) ABSTRACT

A PWM signal generator comprises a pulse width indication signal generator outputting a pulse width indication signal, and a pulse width adjustment portion receiving the pulse width indication signal. The pulse width adjustment portion outputs an adjusted pulse width data which corresponds to the pulse width indication signal when the pulse width indicated by the pulse width indication signal is equal to or wider than a predetermined width. The pulse width adjustment portion accumulates the pulse width indicated by the pulse width indication signal when the pulse width indicated by the pulse width indication signal is narrower than the predetermined width. The pulse width adjustment portion outputs the adjusted pulse width data which corresponds to a sum data of the pulse width accumulated in the pulse width adjustment portion when the sum of the pulse width becomes equal to or wider than the predetermined width.

13 Claims, 5 Drawing Sheets

RELATED ART

PWM SIGNAL GENERATOR

BACKGROUND OF THE INVENTION

1. Field of Invention

This invention relates to a PWM signal generator and, more particularly, to the PWM signal generator which is able to control a rotating speed of a motor to drive an optical disk.

2. Description of Related Art

A rotating speed of a motor is controlled in an optical disk apparatus such as a CD player or a DVD player. The rotating speed is controlled by using a PWM (Pulse Width Modulation) signal.

An analog PWM signal generator and a digital PWM signal generator are known as a PWM signal generator. The analog PWM signal generator generates an analog PWM signal by comparing an analog modulating wave (signal wave) with a triangular wave (career wave). The digital PWM signal generator generates a digital PWM data signal using a triangular career wave which is generated based on a count value counted by an up-down counter. A general motor control circuit which has the analog PWM signal generator is described below.

FIG. 7 shows the motor control circuit 40 having the analog PWM signal generator. The motor control circuit 40 is described in Japanese Unexamined Patent Application Publication No. 05-49263. (Tagami) As shown in FIG. 7, the motor control circuit 40 has a plurality of PWM signal generators 41 and a plurality of motor drive signal generators (motor driver) 42. Each PWM signal generator 41 corresponds to a different modulating wave (sine waves A, B and C). The sine waves A, B and C have different phases respectively. The PWM signal generator 41 receives the sine modulating wave and a triangular career wave T, and generates a pair of PWM signals. As shown in FIG. 7, there are three PWM signal generators. Therefore three pairs of PWM signals (UP and UN, VP and VN, WP and WN) are generated. The motor driver 42 generates drive signals (BUP, BUN, BVP, BVN, BWP and BWN). These drive signals correspond to the PWM signals respectively.

The drive signals (BUP,BUN,BVP,BVN,BWP and BWN) generated by the motor control circuit 40 are input to switching transistors 51 of a motor drive circuit 50 which is shown in FIG. 8. The voltage of each line U, V and W is varied depending on the conductive states of the switching transistors 51. Thereby, the rotating speed of the motor 52 is controlled.

FIG. 9 shows the drive signals which are generated by the motor control circuit 40 and voltage wave forms between lines. The voltage wave forms shown in FIG. 9 are applied between lines U and V, V and W, W and U. Referring to FIG. 9, the PWM signal generator 41 compares the triangular career wave T with sine modulating waves A, B and C. The PWM signal generator 41 generates PWM signals UP, VP and WP which are H level while an instantaneous value of each sine wave is higher than an instantaneous value of the career wave. The PWM signal generator 41 also generates inversed PWM signals UN, VN and WN which are inversed signals of the PWM signals UP, VP and WP. Each drive signal BUP, BUN, BVP, BVN, BWP and BWN which are output from the motor control circuit 40 corresponds to the each PWM signal generated by the PWM signal generator 41.

The drive signals BUP, BUN, BVP, BVN, BWP and BWN are input to the motor drive circuit 50. The voltages between lines shown in FIG. 9 are applied to the motor 52. Therefore, an average voltage between lines which corresponds to the modulating wave is applied to the motor 52, and the motor rotates with a certain rotating speed which is directed by a frequency of the modulating wave.

The use of the digital PWM signal generator is getting popular instead of the use of the analog PWM signal generator in generating the PWM signals UP, VP and WP. A DSP (Digital Signal Processor) is used in generating a digital PWM data (pulse width data). The DSP generally controls not only PWM generators but also other portions of an apparatus. (The DSP is shared as a control portion of other portions of an apparatus)

An operating speed of the DSP is getting faster recently, and therefore a frequency of the career wave which is generated by the up-down counter inside of the DSP is getting higher. As a resolution of the PWM signal is improved, the minimum pulse width of the PWM signal is getting narrower.

However, in accordance with the narrowing of the minimum pulse width, there are some cases that the motor drive circuit is not able to respond to the narrow pulse width even in the maximum response speed of the motor drive circuit.

In these cases, pulses having a narrow width may be ignored by the motor drive circuit. If the pulses are ignored, the drive signal is not generated and the motor does not operate properly. Even if the pulses are not ignored, pulses are damped in the motor drive circuit and the PWM signals are distorted. Therefore, a linear drive of the motor is difficult.

It is desirable that the PWM signal generator is able to control the motor accurately even if the PWM data is generated by the DSP of fast operating speed.

Tagami discloses broadening the pulse width when the pulse width is narrower than a predetermined pulse width. The pulse width is broadened to have the predetermined width in Tagami; therefore, narrow width pulses are not ignored. The minimum width pulses or the narrow width pulses are broadened to have at least the predetermined width. A transformation of pulse width makes a linear speed control based on the PWM signal difficult.

SUMMARY OF THE INVENTION

A PWM signal generator comprises a pulse width indication signal generator outputting a pulse width indication signal, and a pulse width adjustment portion receiving the pulse width indication signal. The pulse width adjustment portion outputs an adjusted pulse width data which corresponds to the pulse width indication signal when the pulse width indicated by the pulse width indication signal is equal to or wider than a predetermined width. The pulse width adjustment portion accumulates the pulse width indicated by the pulse width indication signal when the pulse width indicated by the pulse width indication signal is narrower than the predetermined width. The pulse width adjustment portion outputs the adjusted pulse width data which corresponds to a sum data of the pulse width accumulated in the pulse width adjustment portion when the sum of the pulse width becomes equal to or wider than the predetermined width.

The pulse which is generated by the PWM signal generator of the invention has an enough pulse width not to be ignored.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENT

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Figure 1:
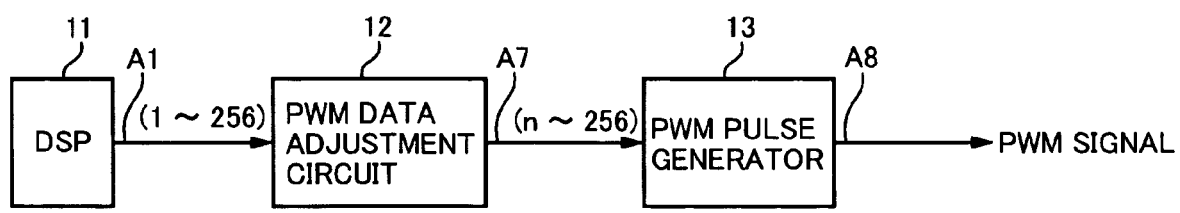
FIG. 1 is a block diagram of the PWM signal generator of the first embodiment.

FIG. 1 shows a PWM signal generator 10 according to the first embodiment of the present invention.

Figure 7:
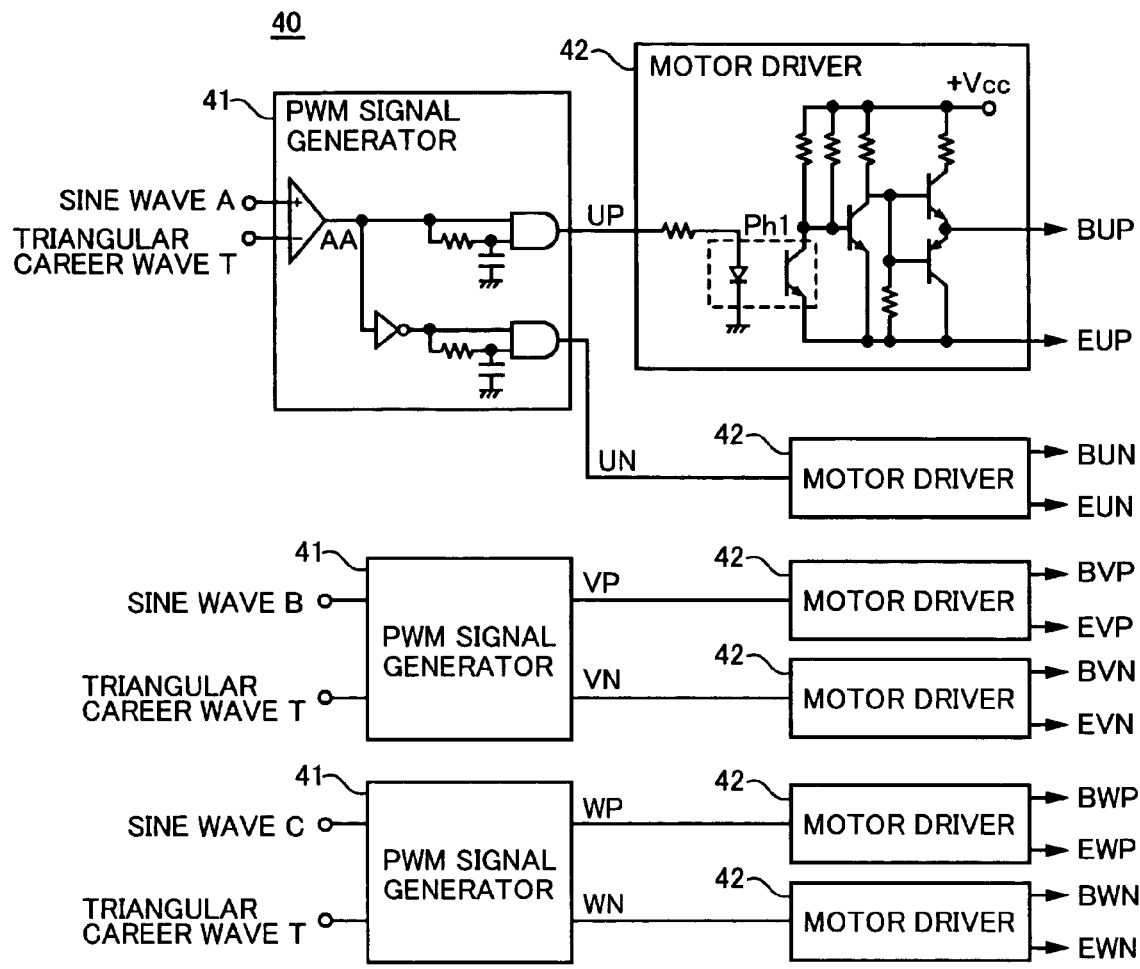
FIG. 7 is a block diagram of the conventional motor drive signal generator.
Figure 8:
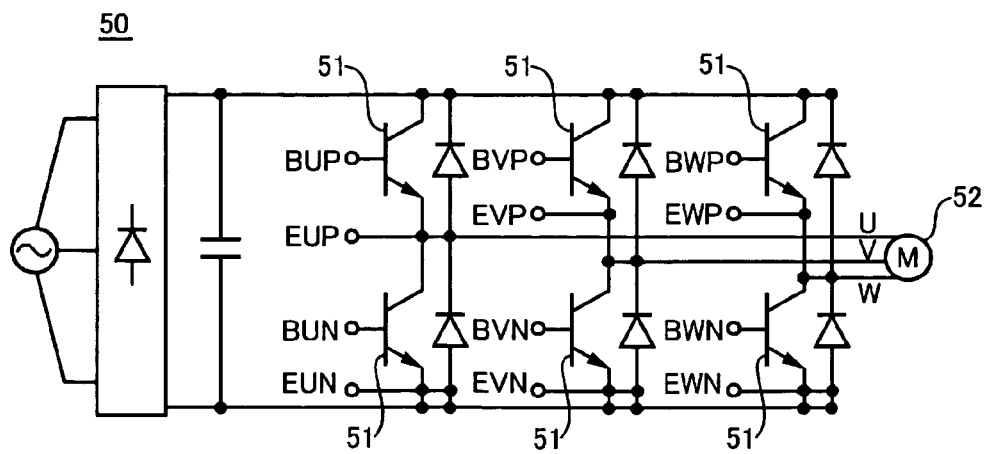
FIG. 8 is a circuit diagram of the conventional motor drive circuit.

The PWM signal generator 10 includes a DSP 11, a PWM data adjustment circuit 12 and a PWM pulse generator 13. The DSP (a pulse width indication signal generator) 11 generates a pulse width data (pulse width indication signal) A1 of eight bits in digital. The pulse width data A1 indicates 256 kinds of pulse widths. In order to simplify the description, the pulse width data is described in numbers such as "1", "2" ... "100" and so on, and the pulse width gets wider as the number increases. For example, a pulse width which corresponds to the pulse width data "1" is the minimum pulse width, and a pulse width which corresponds to the pulse width data "256" is the maximum pulse width in this embodiment. The PWM data adjustment circuit 12 receives the pulse width data A1 from the DSP 11. The PWM data adjustment circuit 12 adjusts the pulse width data A1 when the pulse width data A1 corresponds to a pulse width which is less than a predetermined pulse width. That is, if the pulse width data A1 is less than a predetermined pulse width data n, the pulse width data A1 is adjusted by the PWM data adjustment circuit 12 in this embodiment. Then, the PWM data adjustment circuit 12 outputs an adjusted pulse width data A7. The PWM pulse generator 13 outputs a PWM signal A8 which includes a pulse train for controlling the rotating speed of motor. The PWM signal A8 is generated based on the adjusted pulse width data A7. The PWM signal A8 of the PWM signal generator 10 is able to be used like the PWM signal output by the conventional PWM generator 41 shown in FIG. 7.

Figure 9:
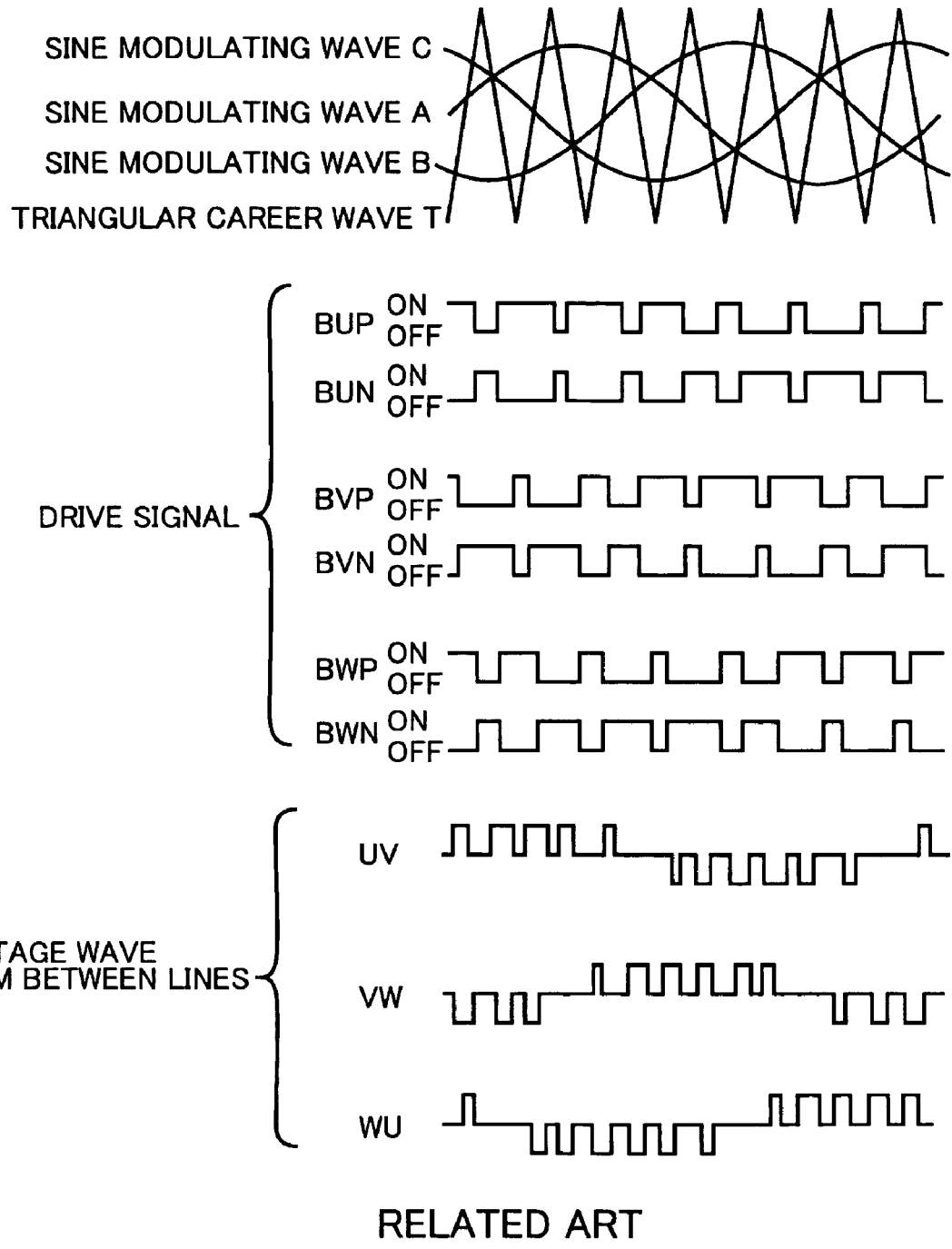
FIG. 9 shows wave forms of the motor drive signal generated by the conventional motor control circuit.

It is possible that the PWM signal generator 10 has a different structure from the above described structure. For example, the PWM signal generator may not have the PWM pulse generator 13. In this case, the output from the PWM data adjustment circuit 12 is input to a micro computer which controls an operation of the motor, and the micro computer generates the motor drive signals BUP, BUN, BVP, BVN, BWP and BWN shown in FIG. 9.

Figure 2:
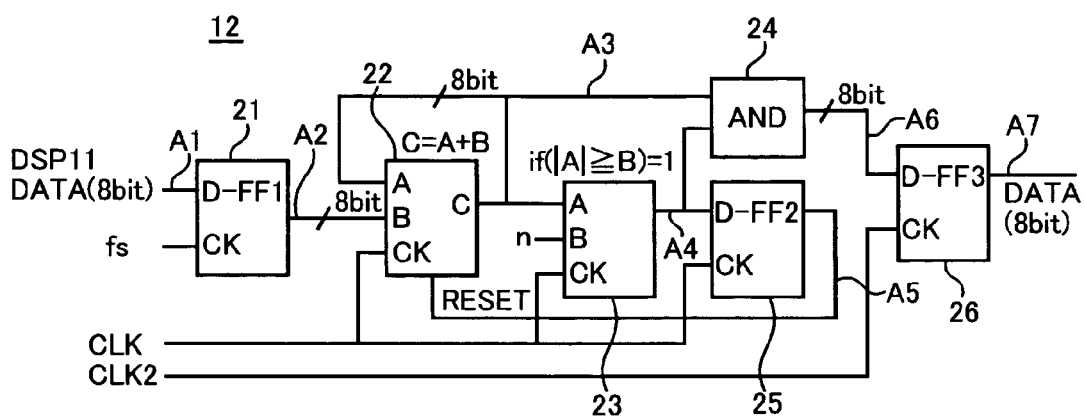
FIG. 2 is a block diagram of the PWM data adjustment circuit shown in FIG. 1.

FIG. 2 shows the PWM data adjustment circuit 12. The PWM data adjustment circuit 12 has a first D-FF (D-type Flip Flop) 21, an accumulator 22, a comparator 23, an AND gate 24, a second D-FF 25 and a third D-FF 26. Though all the components are drawn as a single component, the components deal with data of 8 bits.

The first D-FF 21 receives the pulse width data A1 of 8 bits from DSP 11 every sampling cycle. The accumulator 22 adds the last sum data A3 to the pulse width data A2 output from the first D-FF 21. The accumulator 22 outputs the sum of the last sum data A3 and the pulse width data A2 as a new sum data A3. The comparator 23 compares the sum data A3 with the predetermined data n. The predetermined data n corresponds to the predetermined pulse-width. The comparator 23 outputs a logical "H" level as an output A4 when the sum data A3 indicates the pulse width which is equal to or wider than the predetermined pulse width. That is, if the sum data A3 is equal to or greater than the predetermined data n, the comparator 23 outputs a logical "H" as an activation signal. The logical level of the output A4 of the comparator 23 shows a comparison result.

The AND gate 24 calculate a logical multiplication of the sum data A3 and the comparison result A4. The second D-FF 25 receives the comparison result A4 in response to the first clock signal CLK. The second D-FF 25 (reset portion) resets the sum data A3 of the accumulator 22 when the logical level of the comparison result A4 means "H". The third D-FF 26 (output portion) fetches the output A6 of the AND gate 24 in response to a second clock signal CLK2. The second clock signal CLK2 is a delayed clock of the sampling clock fs. Then, the third flip flop 26 outputs the adjusted pulse width data A7.

The PWM data adjustment circuit 12 fetches the pulse width data A1 of 8 bits from DSP 11 every sampling cycle. The PWM data adjustment circuit 12 adjusts the pulse width data A1 so that the adjusted pulse width data A7 corresponds to the pulse width wider than the predetermined pulse width. The adjusted pulse width data is greater than the predetermined data n. The PWM data adjustment circuit 12 outputs the adjusted pulse width data A7.

Figure 3:
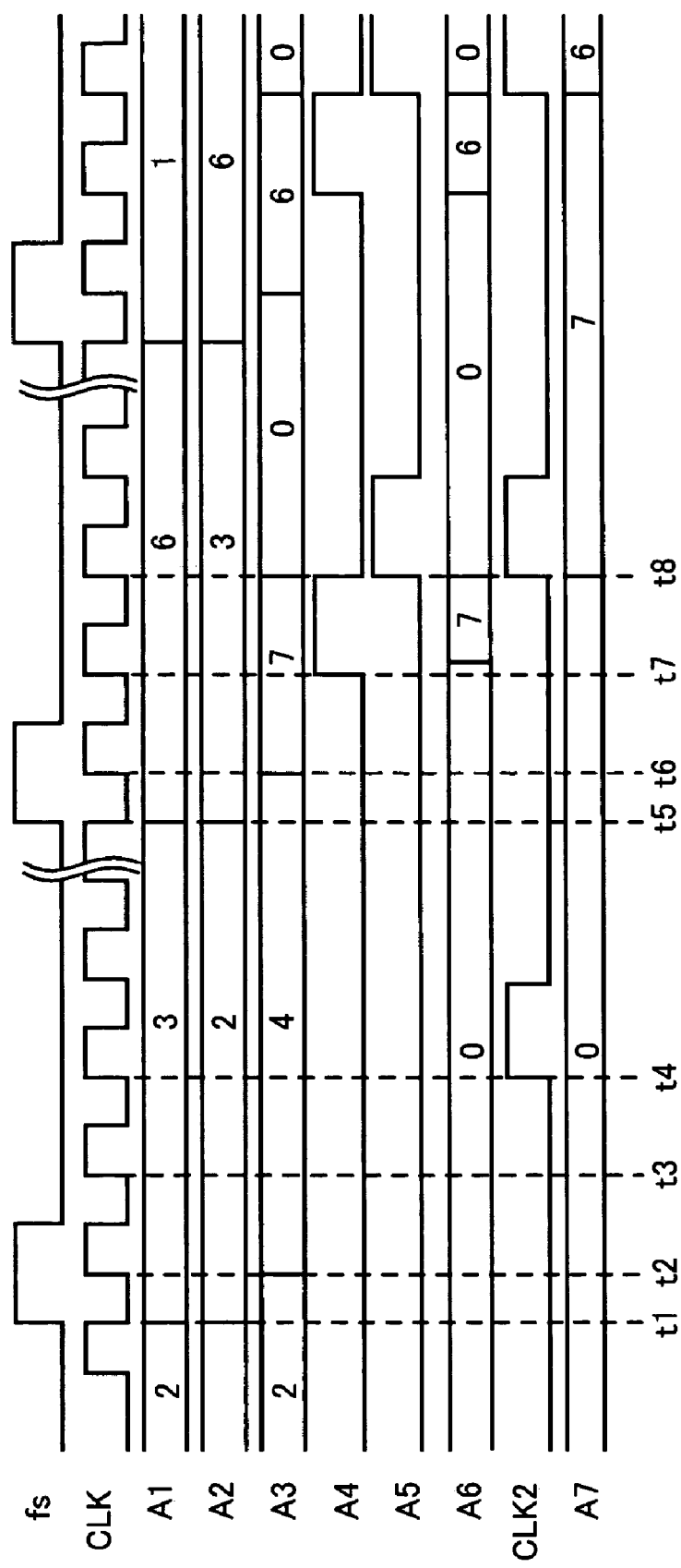
FIG. 3 is a timing chart showing an operation of the PWM data adjustment circuit.

The PWM data adjustment circuit 12 outputs the pulse width data A7 without any adjustment if the pulse width data A1 input to the PWM data adjustment circuit 12 indicates the pulse width which is equal or wider than the predetermined pulse width. (That is, the pulse width data A1 is equal to or greater than n) The PWM data adjustment circuit 12 accumulates the pulse width data A1 in the accumulator 23 if the data A1 indicates a pulse width narrower than the predetermined width. (The pulse width data A1 is less than n) The PWM data adjustment circuit 12 outputs the sum data A3 as one pulse width data if the sum data A3 indicates a pulse width which is equal to or greater than the predetermined pulse width. (The sum data becomes equal to or greater than n.) An operation of the PWM signal generator 10 of the first embodiment is described below with reference to FIG. 3. FIG. 3 shows a timing chart of the signals that represent the operation of the PWM data adjustment circuit 12. FIG. 3 shows the outputs of each component of the PWM data adjustment circuit 12 in accordance with clock signals.

The DSP 11 outputs the pulse width data A1 every sampling cycle. For example, a sampling frequency of the sampling clock fs is 44.1 kHz in the embodiment. The first clock signal CLK controls operations of the accumulator 22, the comparator 23 and the second D-FF 25. The first clock signal CLK is, for example, an operation clock of the micro computer which controls the motor. The frequency of the first clock signal CLK is sufficiently higher than the sampling frequency of the sampling clock fs. The frequency of the first clock signal CLK is 33.8688 MHz in this embodiment. The second clock signal CLK2 of the embodiment has the same frequency of the sampling clock fs, and is delayed by 2.5 clocks of the first clock signal from the sampling clock fs.

The first D-FF 21 fetches the pulse width data A1 from DSP 11 at every rising edge of the sampling clock fs. The accumulator 22 adds the pulse width data A2, which is fetched this time, to the last sum data A3 in response to the rising edge of the first clock signal. Then, the accumulator 22 outputs the new sum data A3.

The comparator 23 determines whether the sum data A3 indicates the pulse width which is equal or wider than the predetermined width or not, (The sum data A3 is equal to or greater than a predetermined value n) in response to the rising edge of the first clock signal CLK. If the sum data A3 of the accumulator 22 is greater than n, the comparator 23 outputs the logical "H" as the output A4.

The third D-FF 26 fetches the output A6 of the AND gate 24 in response to the rising edge of the second clock signal CLK2. The output A6 of the AND gate 24 corresponds to the logical product of the comparison result A4 and the sum data A3. In case the comparison result A4 is logical "H", the output A5 of the second D-FF 25 becomes "H" at the rising edge of the first clock signal CLK. Therefore, the accumulator 22 is reset, and outputs "0" as the sum data A3. As described above, the data adjustment circuit 12 outputs the sum data A3 as the pulse width data when the comparison result A4 is logical "H". The data adjustment circuit 12 outputs data "0" when the comparison result is logical "L".

In the example shown in FIG. 3, the predetermined data n is "5". The first D-FF fetches data "2" as the pulse width data A1, which is output from the DSP 11, in the first sampling cycle in response to the rising edge of the sampling clock fs (Please refer to t1 of FIG. 3). At the rising edge of the first clock signal CLK, the accumulator adds the data "2" fetched in the first sampling cycle to the last sum data "2", and the sum data A3 becomes data "4" (Please refer to t2 of FIG. 3).

The comparator 23 compares the sum data "4" and the predetermined data "5" at the rising edge of the first clock signal (Please refer to t3 of FIG. 3). The comparator 23 outputs the comparison result logical "L" since the sum data "4" is less than the predetermined data "5". Thereby, the logical product of the sum data "4" and the comparison result becomes data "0". The third D-FF 26 fetches data "0" at the rising edge of the second clock signal CLK2 (Please refer to t4 of FIG. 3). The accumulator 22 is not reset because the comparison result is logical "L".

The first D-FF 21 fetches the pulse width data "3" in the second sampling cycle (Please refer to t5 of FIG. 3). The accumulator 22 adds the fetched data "3" and the last sum data "4" at the rising edge of the first clock signal CLK (Please refer to t6 of FIG. 3). The accumulator 22 outputs the sum data "7".

The comparator 23 compares the sum data "7" and the predetermined data "5" at the next rising edge of the clock, and outputs the comparison result logical "H" (Please refer t7 of FIG. 3).

The output A6 of the AND gate 24 becomes data "7". The third D-FF 26 fetches the data "7" at the rising edge of the second clock signal CLK2. The third D-FF outputs the fetched data "7" (Please refer t8 of FIG. 3). The accumulator is reset because the comparison result is logical "H".

The first D-FF 21 fetches the data "6" in the third sampling cycle. The accumulator adds the fetched data "6" to the last sum data "0", and outputs the sum data "6". The comparator 23 compares the sum data "6" with the predetermined data "5", and outputs the comparison result "H".

The logical production of the sum data "6" and the comparison result "H" becomes "6". The third D-FF 26 fetches the data "6" at the rising edge of the second clock signal CLK2, and outputs this data. The accumulator 22 is reset because of the comparison result "H".

Figure 4:
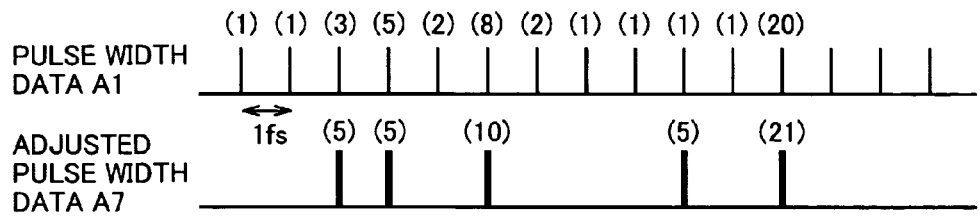
FIG. 4 is a timing chart showing the PWM data signal generated by the first embodiment and the PWM data signal generated by the conventional PWM signal generator.

As described above, all of the pulse width data which are output from the pulse data adjustment circuit 12 indicates a width wider than the predetermined width. This predetermined width is defined by the predetermined data n. FIG. 4 shows a conventional pulse width data which is output from the DSP 11 and the adjusted pulse width data A7 which is adjusted by the PWM signal adjustment circuit 12. The value in the parentheses of FIG. 4 shows a pulse width data. The general PWM signal generator outputs the pulse width data generated by the DSP 11 without any adjustment. Therefore, the minimum pulse width data "1" or the narrow pulse width data "2", "3" and "4" are output as shown in the upper side of FIG. 4.

On the other hand, the PWM data adjustment circuit 12 of the embodiment outputs the pulse width data without any adjustment when the pulse width data is equal to or greater than the predetermined data n, and does not output the pulse width data A7 when the pulse width data is less than n. The PWM data adjustment circuit 12 accumulates the input data A1 if the pulse width data A1 is less than n, and output the sum data when the sum data becomes equal to or greater than n.

The PWM signal A8 generated by the PWM signal generator 10 of the embodiment have enough pulse width for the motor driver to respond. The motor driver can respond to all the pulses output by the PWM signal generator 10.

Figure 5A:
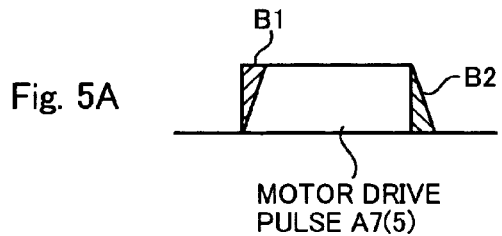
FIG. 5A shows deformation of the wave form of the motor drive signal.
Figure 5B:
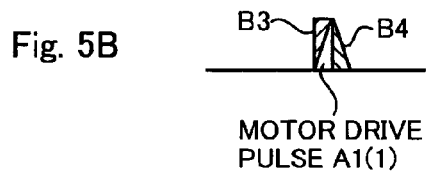
FIG. 5B shows deformation of the wave form of the motor drive signal.

FIG. 5A and 5B show the wave forms of the motor drive pulses when the pulse is input to the motor drive circuit. FIG. 5A corresponds to the wave form of the pulse which has the pulse width indicated by the pulse width data "5". FIG. 5B corresponds to the wave form of the pulse which has the pulse width indicated by the pulse width data "1".

The average voltage which is applied to the motor is defined by the all the pulse widths of the motor drive pulses. The pulse which is generated by the PWM signal generator 10 of the embodiment has an enough pulse width for the motor to drive. Even if the deformation of the pulse occurs at the rising edge and the falling edge, a deformed area of the pulse is minute when the whole width of the pulse is considered. Therefore, an error of the pulse area caused by the deformation of the edges is minute.

On the other hand, in a case the pulse width is narrow, the deformed area has a high proportion of the whole pulse width. Therefore, the error of the pulse area caused by the deformation of the edges is not minute. The error is not negligible when the pulse width is narrow, especially when the pulse width is narrower than the pulse width indicated by the pulse width data "4". When the pulse width is narrower than the pulse width indicated by the pulse width data "4", there are some cases that the pulse signal begin to fall before the voltage of the motor drive signal reaches to the enough voltage to drive a motor.

As described above, the pulse width output from the motor driver has less error compared to the pulse width indicated by the pulse width data. Therefore, the linear motor drive is achieved. The predetermined value n may be changed on demand.

Figure 6:
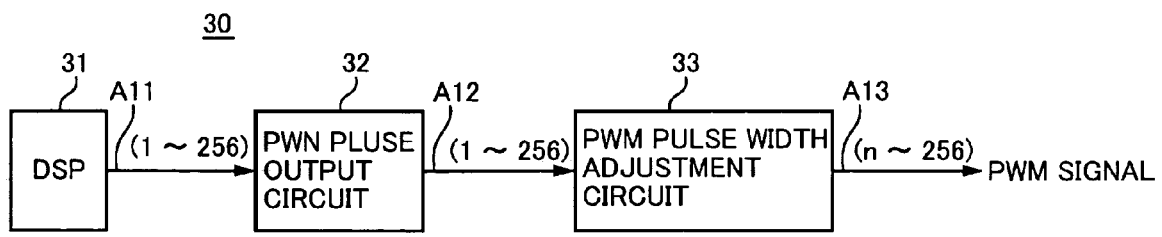
FIG. 6 is a block diagram of the PWM signal generator of the second embodiment.

FIG. 6 shows a PWM signal generator 30 of the second embodiment. In this embodiment, a PWM pulse output circuit 32 outputs a pulse train A12 having various widths that corresponds to the pulse width data "1" to "256" in accordance with the pulse width data A11 output from DSP. The PWM pulse width adjustment circuit 33 adjusts the pulse width of the pulse train output from the PWM pulse output circuit 32. The PWM pulse width adjustment circuit outputs a pulse train A13 having a width that corresponds to the pulse width data "n" to "256" by uniting some of pulses.

The structure of the DSP 31 and the PWM pulse output circuit 32 is the same as the conventional PWM signal generator. The PWM pulse width adjustment circuit is added to the conventional PWM signal generator in the second embodiment. The PWM pulse width adjustment circuit 33 has a pulse width measuring portion, a pulse width adjustment portion and PWM pulse generating portion. The pulse width measuring portion measures the pulse width of each pulse output from the PWM pulse output circuit 32. The pulse width measuring portion outputs pulse width data based on the measurement of the pulse width. That is, the pulse width measuring portion regenerates the pulse width data. The pulse width adjustment portion adjusts the pulse width based on the pulse width data output from the pulse width measuring portion. The PWM pulse generating portion generates the pulse train based on the adjusted pulse width. The pulse width adjustment circuit 12 of the first embodiment can be used as the pulse width adjustment portion, and the PWM pulse generator 13 can be used as the pulse generating portion in the second embodiment.

The PWM signal generator of this invention is used for servo control of the optical disk apparatus such as a CD player or a DVD player.

It is apparent that the present invention is not limited to the above embodiment, that may be modified and changed without departing from the scope and spirit of the invention.

What is claimed is:

1. A pulse width modulation (PWM) signal generator comprising:
    a pulse width indication signal generator outputting a pulse width indication signal; and
    a pulse width adjustment portion receiving the pulse width indication signal, outputting an adjusted pulse width data which corresponds to the pulse width indication signal when the pulse width indicated by the pulse width indication signal is equal to or wider than a predetermined width, accumulating the pulse width indicated by the pulse width indication signal when the pulse width indicated by the pulse width indication signal is narrower than the predetermined width, outputting the adjusted pulse width data which corresponds to a sum data of the pulse width accumulated in the pulse width adjustment portion when the sum of the pulse width becomes equal to or wider than the predetermined width, the pulse width adjustment portion comprising:
    a flip flop receiving the pulse width indication signal, outputting a first pulse width data;
    an accumulator adding the first pulse width data to a last sum data of the accumulator in response to a clock signal, outputting a new sum data of the pulse width; and
    a comparator comparing the new sum data with a predetermined data in response to the clock signal, outputting an activation signal when the new sum data is equal to or greater than the predetermined data.

2. The PWM signal generator according to claim 1, the pulse width adjustment portion further comprising:
    a gate making a pass of the new sum data in response to the activation signal;
    a reset portion resetting the output of the accumulator in response to the activation signal; and
    an output portion outputting the new sum data which is applied via the gate as the adjusted pulse width data.

3. The PWM signal generator according to claim 2, wherein the reset portion comprises a flip flop.

4. The PWM signal generator according to claim 2, wherein the output portion comprises a flip flop.

5. A pulse width modulation (PWM) signal generator comprising:
    a pulse width adjustment circuit receiving data representing a pulse width data included in a PWM pulse train and comparing said pulse width data to a reference value n,
    said pulse width adjustment circuit comprising an accumulator that adds the received pulse width data with an amount currently in said accumulator and outputs an accumulated amount when the accumulated amount is greater than or equal to said reference value n.

6. The PWM signal generator of claim 5, wherein said pulse width adjustment circuit outputs data "0" when the accumulated amount is less than said reference value n.

7. The PWM signal generator of claim 5, wherein said accumulator is reset to an accumulated amount "0" when the accumulated amount is greater than or equal to said reference value n and provided as an output.

8. The PWM signal generator of claim 5, further comprising:
    a PWM pulse generator that receives an output of said pulse width adjustment circuit and provides a pulse train for controlling a rotation speed of a motor.

9. The PWM signal generator of claim 5, further comprising:
    a micro computer which controls an operation of a motor.

10. The PWM signal generator of claim 5, wherein said reference value n comprises data that can be changed.

11. The PWM signal generator of claim 5, as comprising a digital circuit, said PWM signal generator further comprising:
    a first clock signal interconnected to control an input of said received pulse width data;
    a second clock signal interconnected to control said accumulator; and
    a third clock signal interconnected to control an output of said pulse width adjustment circuit.

12. The PWM signal generator of claim 5, wherein the received data comprises a digital word.

13. The PWM signal generator of claim 12, wherein the digital word is generated by a digital signal processing (DSP) circuit.

* * * * *